United States Patent
Martin

(10) Patent No.: US 9,632,195 B2
(45) Date of Patent: Apr. 25, 2017

(54) STEERABLE FAIRING STRING

(71) Applicant: GX Technology Canada LTD., Calgary (CA)

(72) Inventor: Daniel George Martin, Woodstock (CA)

(73) Assignee: GX Technology Canada LTD., Calgary, Alberta (CA)

( * ) Notice: Subject to any disclaimer, the term of this patent is extended or adjusted under 35 U.S.C. 154(b) by 79 days.

(21) Appl. No.: 14/353,075

(22) PCT Filed: Oct. 26, 2012

(86) PCT No.: PCT/CA2012/000996
§ 371 (c)(1),
(2) Date: Apr. 21, 2014

(87) PCT Pub. No.: WO2013/059926
PCT Pub. Date: May 2, 2013

(65) Prior Publication Data
US 2014/0247691 A1    Sep. 4, 2014

Related U.S. Application Data

(60) Provisional application No. 61/552,652, filed on Oct. 28, 2011.

(51) Int. Cl.
*G01V 1/38* (2006.01)
*B63B 21/66* (2006.01)
(52) U.S. Cl.
CPC ............ *G01V 1/3826* (2013.01); *B63B 21/66* (2013.01)

(58) Field of Classification Search
CPC ...... G01V 1/3826; B63B 21/663; B63B 21/66
(Continued)

(56) References Cited

U.S. PATENT DOCUMENTS 3,943,483 A    3/1976   Strange
4,010,706 A *   3/1977   Pretet ........................ G01V 3/15
                                                                     114/245

(Continued)

FOREIGN PATENT DOCUMENTS

DE          3933398 A1    4/1991
EP       0 884 607 A2   12/1998
(Continued)

OTHER PUBLICATIONS

May 2, 2013 International Search Report and Written Opinion in corresponding International Patent Application No. PCT/CA2012/000996 (6 pages).

(Continued)

*Primary Examiner* — Ian J Lobo
(74) *Attorney, Agent, or Firm* — Dorsey & Whitney LLP

(57) ABSTRACT

A foil having a leading edge, trailing edge, chord and span is attached between a first head float position and bottom submerged position below the head float on the array. The foil being flexible along its span and has a first interior conduit rearward of the leading edge and a second interior conduit forward of the trailing edge. The conduits are centered on the chord and separated by a distance. A first cable having a first length is strung inside the first conduit and a second cable having a second length is strung inside the second conduit, and an adjustment mechanism is used to vary the length of the first cable relative to the length of the second cable and vice versa.

17 Claims, 10 Drawing Sheets

(58) Field of Classification Search
USPC .................. 367/16–17; 114/243–244
See application file for complete search history.

(56) References Cited

U.S. PATENT DOCUMENTS

| | | |
|---|---|---|
| 4,365,574 A | 12/1982 | Norminton |
| 4,404,664 A | 9/1983 | Zachariadis |
| 4,484,534 A | 11/1984 | Thillaye du Boullay |
| 4,567,841 A | 2/1986 | Hale |
| 4,829,929 A | 5/1989 | Kerfoot |
| 6,144,342 A | 11/2000 | Bertheas et al. |
| 6,189,475 B1 | 2/2001 | Coakley |
| 6,532,189 B2 | 3/2003 | Barker |
| 6,671,223 B2 | 12/2003 | Bittleston |
| 7,380,513 B2 | 6/2008 | Lie |
| 7,404,370 B2 | 7/2008 | Stokkeland |
| 7,499,373 B2 | 3/2009 | Toennessen |
| 7,738,317 B2 | 6/2010 | Toennessen |
| 7,755,970 B2 | 7/2010 | Welker et al. |
| 7,793,606 B2 | 9/2010 | Olivier et al. |
| 9,075,165 B2 | 7/2015 | Vageskar et al. |
| 2006/0176775 A1 | 8/2006 | Toennessen |
| 2008/0029012 A1 | 2/2008 | Stokkeland |
| 2010/0149910 A1 | 6/2010 | Martin |
| 2011/0203509 A1 | 8/2011 | Austad et al. |
| 2012/0067265 A1 | 3/2012 | Valo et al. |
| 2013/0182531 A1 | 7/2013 | Gagliardi et al. |
| 2014/0104985 A1 | 4/2014 | Gagliardi et al. |

FOREIGN PATENT DOCUMENTS

| | | |
|---|---|---|
| GB | 108791 A | 8/1917 |
| GB | 2342081 A | 4/2000 |
| GB | 2400662 B | 8/2006 |
| WO | 2010111377 A2 | 9/2010 |

OTHER PUBLICATIONS

Apr. 29, 2014 International Preliminary Report on Patentability in corresponding International Patent Application No. PCT/CA2012/000996 (4 pages).
Jun. 24, 2014 Patent Examination Report No. 1 in corresponding Australian Patent Application No. 2012327836 (2 pages).
Sep. 16, 2015 Extended European Search Report in corresponding European Patent Application No. 12844247.2 (5 pages).
First Office Action dated Aug. 10, 2015 in connection with Danish Patent Application No. PA 2014 00278, 7 pages.
Second Office Action dated Mar. 1, 2016 in connection with Danish Patent Application No. PA 2014 00278, 2 pages.

* cited by examiner

DIRECTION OF TRAVEL

DIRECTION OF TRAVEL

STEERABLE FAIRING STRING

FIELD OF THE INVENTION

The invention relates to seismic arrays and an apparatus and method for maintaining required spacing between sub-arrays and streamer cables, as the case may be that are towed behind a vessel.

BACKGROUND OF INVENTION

Seismic arrays consisting of source arrays and receiver arrays are used to study the strata of the rock structure below the ocean surface. To survey a specific area of the ocean floor, an exploration vessel is used to tow source and/or receiver arrays along a specified path covering the desired surface area of the ocean floor. The source and receiver arrays are used to obtain relevant geological data. Typically a single surface vessel will simultaneously tow both the source and receiver arrays, but sometimes an exploration vessel will only tow either the source array or receiver array. Other times, only a source array is towed while the receiver array is deployed on the ocean floor and remains stationary.

A prior art seismic receiver array is shown in FIG. 3 comprising multiple streamer cables typically ranging in length from approximately 1500 to 9000 meters. Each streamer cable is adapted with hydrophone groupings spaced at regular intervals along the length of the streamer cable. The streamer cables are deployed below the ocean surface at a specified depth or depths.

During operation, the acoustic shock wave generated by the source array penetrates the ocean floor and is reflected back. The reflected acoustic signatures are recorded by the hydrophone groupings in the streamer cables for subsequent analysis.

A seismic exploration vessel is generally capable of simultaneously towing both a source array and a receiver array. Importantly, lateral spreading forces must be applied to maintain the required spacing between the sub-arrays and streamer cables as they are towed behind the vessel. The required spacing depends, inter alia, on the number of streamer cables deployed and the interstitial spacing required between adjacent cables.

Typically, the air gun sub-arrays may be spread out laterally over a distance of approximately 12.5 to 100 meters, and the streamer cables over a distance of approximately 100 to 1500 meters.

A common method of achieving the required lateral spacing between sub-arrays and streamer cables is to deploy a divertor or paravane on a dedicated towing rope from the exploration vessel. A string of separation ropes are used to daisy-chain one streamer cable to the next to achieve the desired spacing between the streamer cables.

A number of approaches are employed to reduce the towing drag forces generated. Examples of such methods are the use of small diameter cables, high efficiency paravanes and the use of conventional cable fairings on separation ropes and lead-in cables. The prior art cable fairings utilize a single rope threaded through the nose of the fairing to allow the fairing to self-align with the direction of flow by way of free-swiveling.

Various methods of controlling the position of the towed equipment have been proposed to increase the quality of the seismic data being generated. One such method, for example, is the use of controllable foils or birds secured at approximately 300 meter intervals along the length of each streamer cable. The controllable foils are used to maintain the equipment at both a desired depth profile and a desired lateral offset throughout the length of the streamers.

SUMMARY OF THE INVENTION

One object of the present invention is to provide an apparatus and method for steering of the equipment towed behind an exploration vessel to achieve improved positional control of source and receiver arrays thereby increasing data quality.

Another object of the present invention is to reduce the overall towing burden or associated drag resulting from equipment towed behind an exploration vessel.

An object of the present invention in the field of marine seismic arrays is to eliminate the requirement for paravanes, dedicated paravanes tow ropes, and separation ropes used to maintain the required lateral spacing between sub-arrays and streamer cables. In addition, the need for associated deck equipment including, for example, paravane winches and davits, and separation rope storage reels is eliminated.

According to one object of the present invention a foil having a leading edge, trailing edge, chord.

According to another object of the present invention the foil is used to replace a forward suspension rope in a source array and a float tagline in a receiver array.

According to yet another object of the present invention the foil is asymmetrical in cross section and is in the shape of an air foil.

According to yet another aspect of the present invention the first and second conduits may be offset to either side of the chord.

According to yet another object of the present invention depressors are attached at the top and bottom ends of the foil.

According to yet another object of the present invention the foil is divided into a plurality of discreet segments either abutting one another or attached to one another.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DETAILED DESCRIPTION OF PREFERRED EMBODIMENTS

Figure 1:
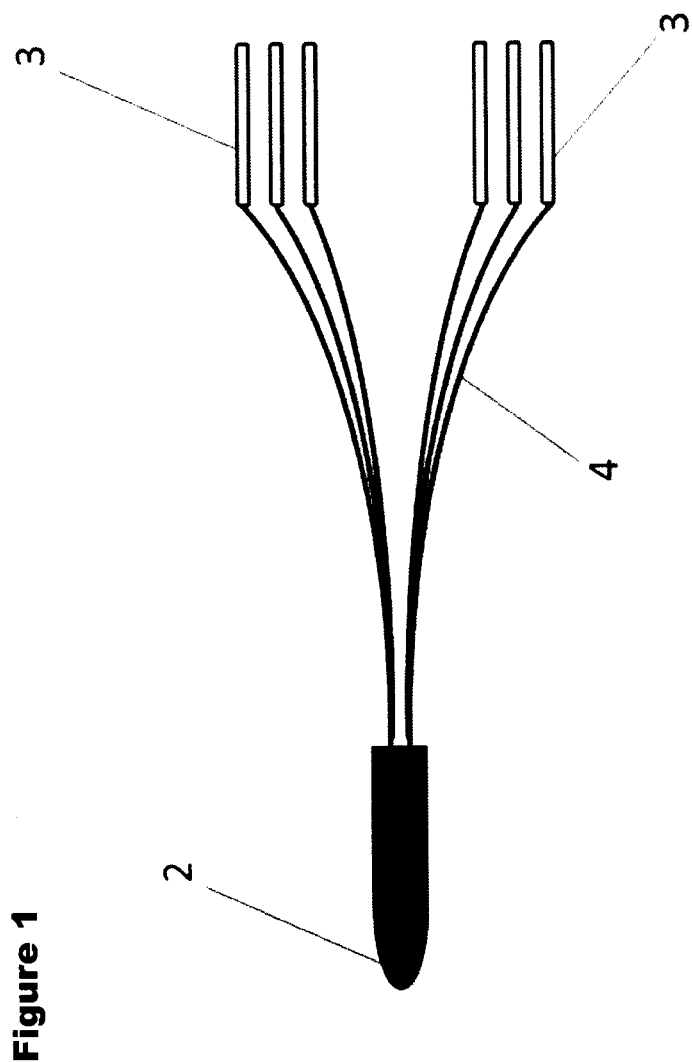
FIG. 1 is a top schematic illustration of an exploration vessel towing port and starboard source arrays.
Figure 2:
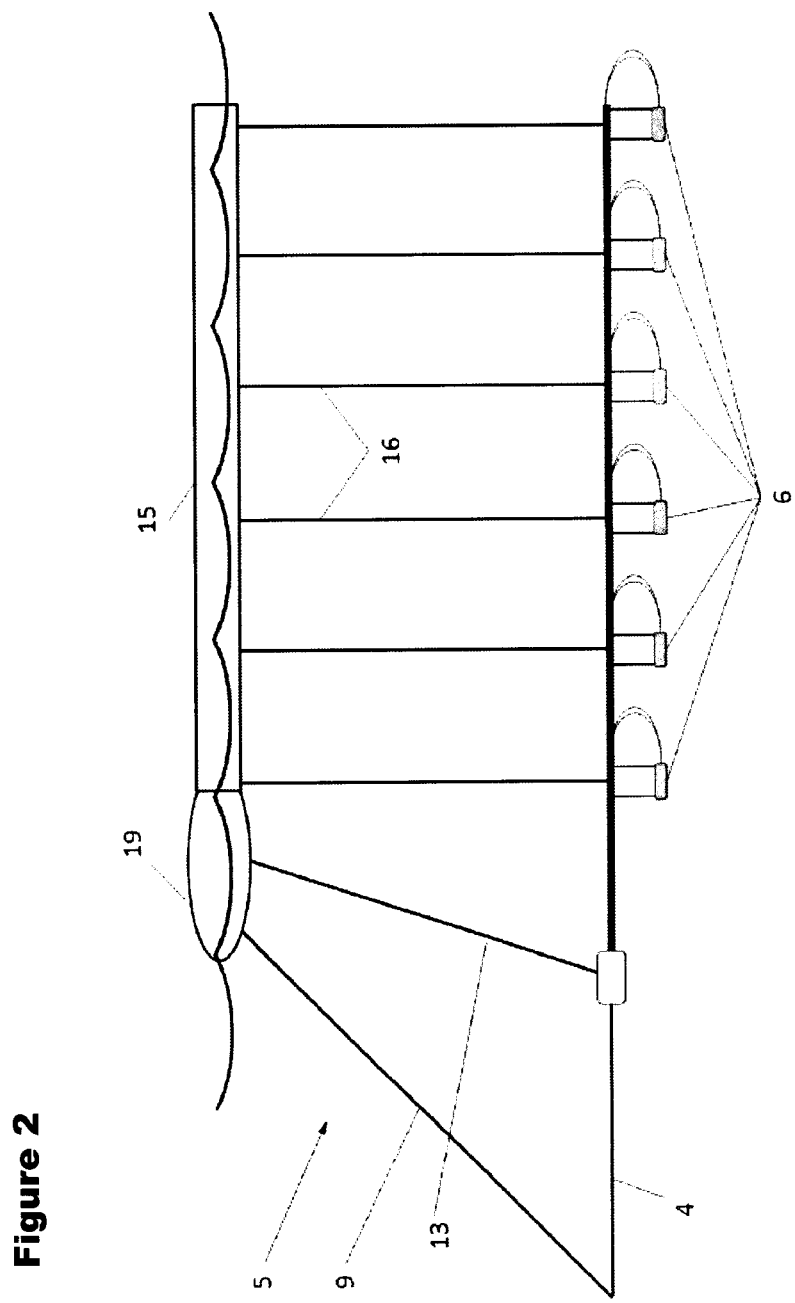
FIG. 2 is a side schematic illustration of a sub-array.

A prior art seismic dual source array 3 towing configuration is schematically shown by way of example in FIGS. 1 and 2 having three sub-arrays on each side. High pressure air guns 6 are used to generate an acoustic shock wave. Each sub-array 3 is towed by an umbilical cable 4 and comprise a head float 19, a tail float 15, air guns 6 forward suspension rope 13 and suspension ropes 16 and a tow leader 9.

As shown in FIG. 2, a tow leader 9 is provided to prevent the head float 19 and tail float 15 of the air gun sub-array 5 from being pushed aft by the towing drag forces exerted on the sub-array and to maintain the suspension ropes 16 in a vertical orientation. The suspension ropes 16 are preferably maintained in a vertical orientation to ensure a consistent geometry for the air gun sub-array 5 since the depth of the air guns 6 below the surface is determined by the length of the suspension ropes 16.

Figure 3:
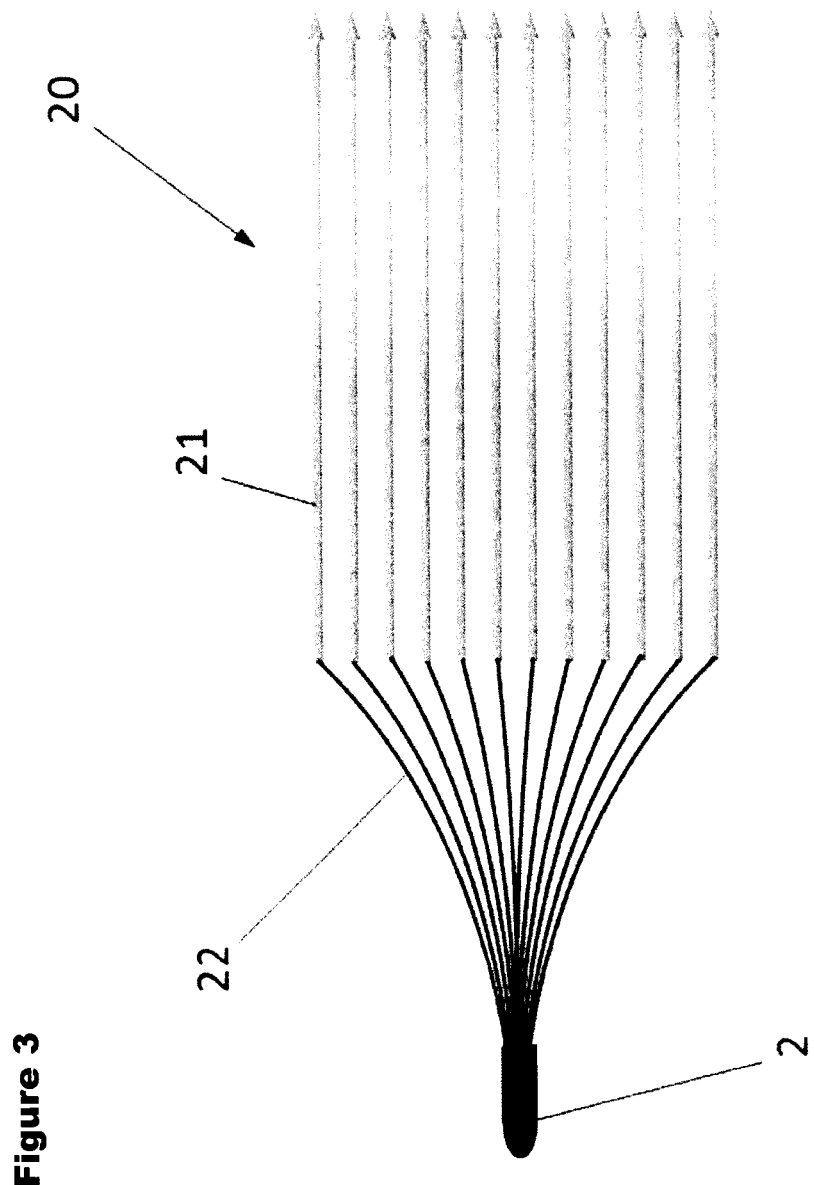
FIG. 3 is a top schematic illustration of an exploration vessel towing a seismic receiver array.
Figure 4:
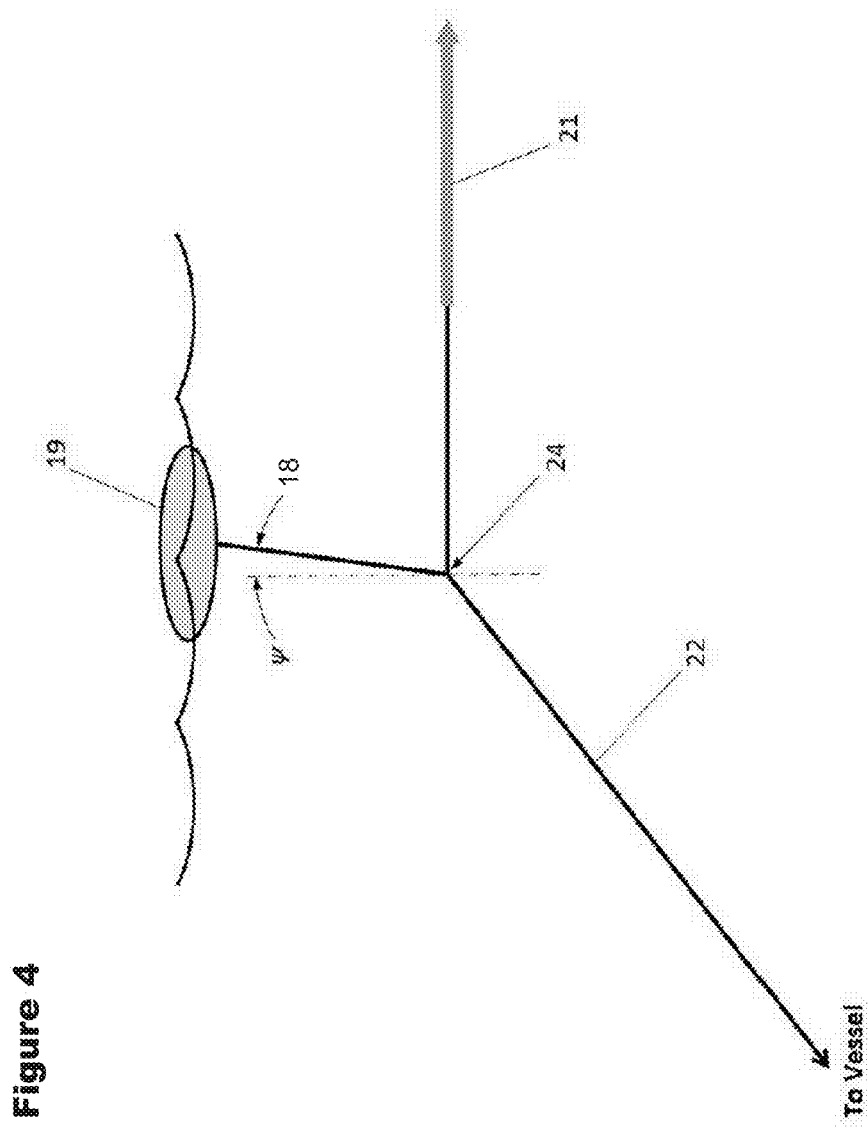
FIG. 4 is a partial side schematic illustration of a seismic array.

A prior art seismic receiver array 20 is shown in FIG. 3 comprising multiple streamer cables 21 typically ranging in length from approximately 1500 to 9000 meters. Each streamer cable 21 is adapted with hydrophone groupings spaced at regular intervals along the length of the streamer cable 21. The streamer cables 21 are deployed below the ocean surface at a specified depth or depths. As shown in FIG. 4, head floats 19 are used to support lead-in cables 22 above the connection point between the lead-in cables 22 and the streamer cables 21 by means of float taglines 18. The length of the float tagline controls the depth of the lead-in cable 22 at the connection point 24. As shown in FIG. 4, drag towing forces acting on the head float 19 may cause the float tagline to be pulled out of a vertical position above the connection point and assume a small layback angle ψ.

During operation, the acoustic shock wave generated by the source array 3 penetrates the ocean floor and is reflected back. The reflected acoustic signatures are recorded by the hydrophone groupings in the streamer cables 21 for subsequent analysis.

A seismic exploration vessel 2 is generally capable of simultaneously towing both a source array 3 and a receiver array 20. Importantly, lateral spreading forces must be applied to maintain the required spacing between the sub-arrays 5 and streamer cables 21 as they are towed behind the vessel. The required spacing depends, inter alia, on the number of streamer cables 21 deployed and the interstitial spacing required between adjacent cables.

Typically, the air gun sub-arrays 5 may be spread out laterally over a distance of approximately 12.5 to 100 meters, and the streamer cables 21 over a distance of approximately 100 to 1500 meters.

According to the present invention a steerable fairing string or foil is provided as part of the rigging for marine seismic arrays. In general a fairing string comprises as an immersed foil shaped flexible string which generates hydrodynamic steering forces, port or starboard as may be required, to thereby control the desired spacing between elements of the seismic array.

A fairing string (hereinafter used interchangeably as wing section or foil) 1 according to one embodiment of the present invention is shown in cross section in FIG. 7. The fairing string 1 has a leading edge 7, trailing edge 8, chord 17 and two rope or cable receiving conduits running the length of the span. The conduits are provided for stringing cables or ropes between the head float and a submerged position on the towed array as will be hereafter described.

A forward conduit 10 is located in the leading edge section of the fairing centered on the chord 17 and receives a forward suspension rope 13. An aft conduit 12 is located in the trailing edge centered on the chord section of the fairing and receives an aft suspension rope 14. Preferably the distance between the conduits is maximized such that the conduits are located as forward or aft as possible. The free rotation of the fairing string 1 about the forward suspension rope 13 is thus restricted according to the present invention by the aft suspension rope 14. Together the ropes are used to effect steering of the fairing string 1 as will be described hereafter.

According to one embodiment of the present invention, one continuous span of fairing is threaded from end to end with the forward and aft suspension ropes 14. The fairing, forward suspension rope 13, and aft suspension rope 14 collectively form a fairing string 1. Alternatively, a plurality of discrete fairing segments each having shortened span may be threaded onto the suspension ropes with zero or nominal spacing between each segment. The adjacent fairing segments may be connected to each other chain-like by way of linkages known in the art at various locations such as the leading edge, trailing edge and mid-chord. Alternatively, adjacent fairing segments can simply abut each other with no interconnecting linkages used.

The fairing string is flexible along its length and will assume a curved profile for generating hydrodynamic lift forces. The suspension ropes offers no bending resistance. Thus, a preferred material for the foil is, for example, a plastic polyurethane that offers low cost and light weight. Rigid materials can be also be used for a chain-like segmented foil which will equally curve.

Figure 5:
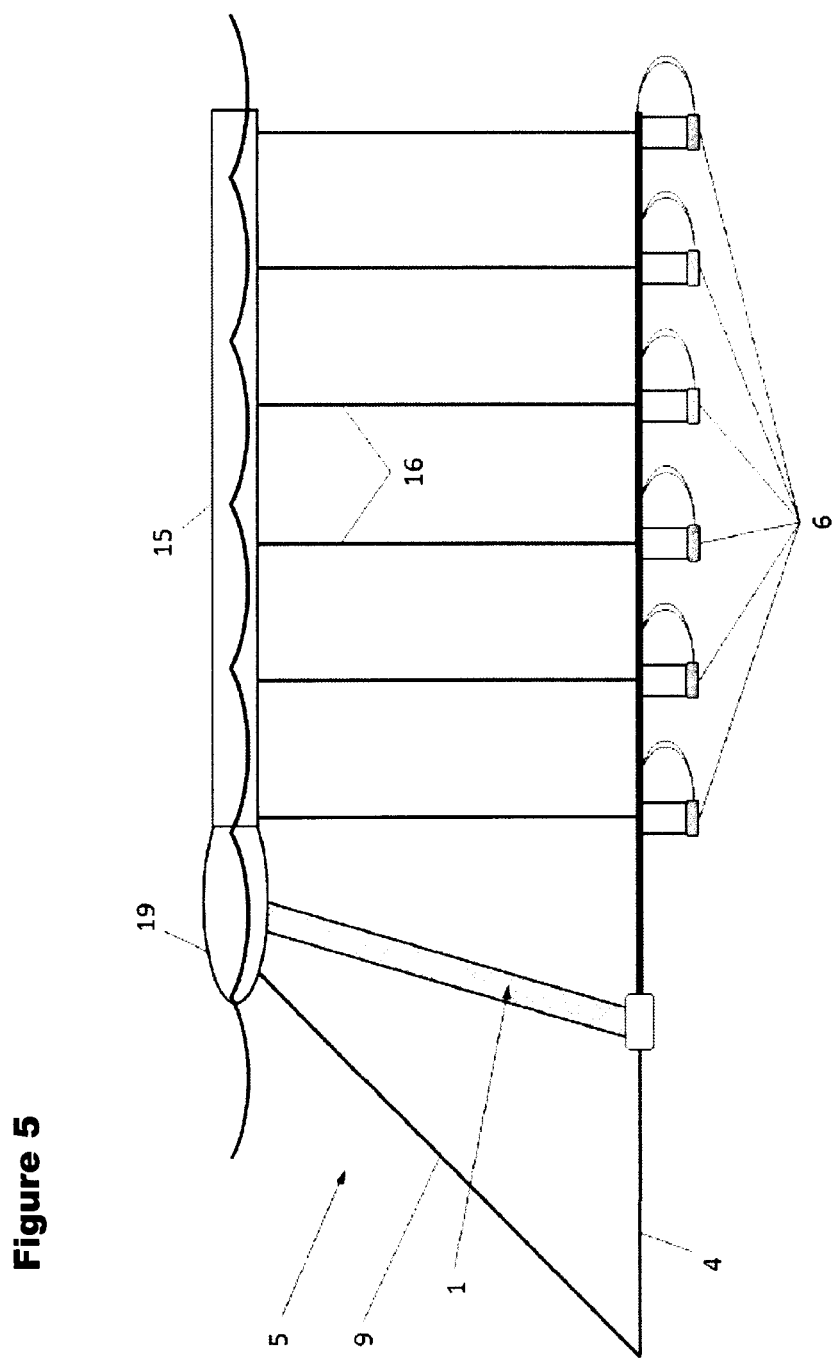
FIG. 5 is the schematic illustration of FIG. 2 with a steerable fairing string according to the present invention.
Figure 6:
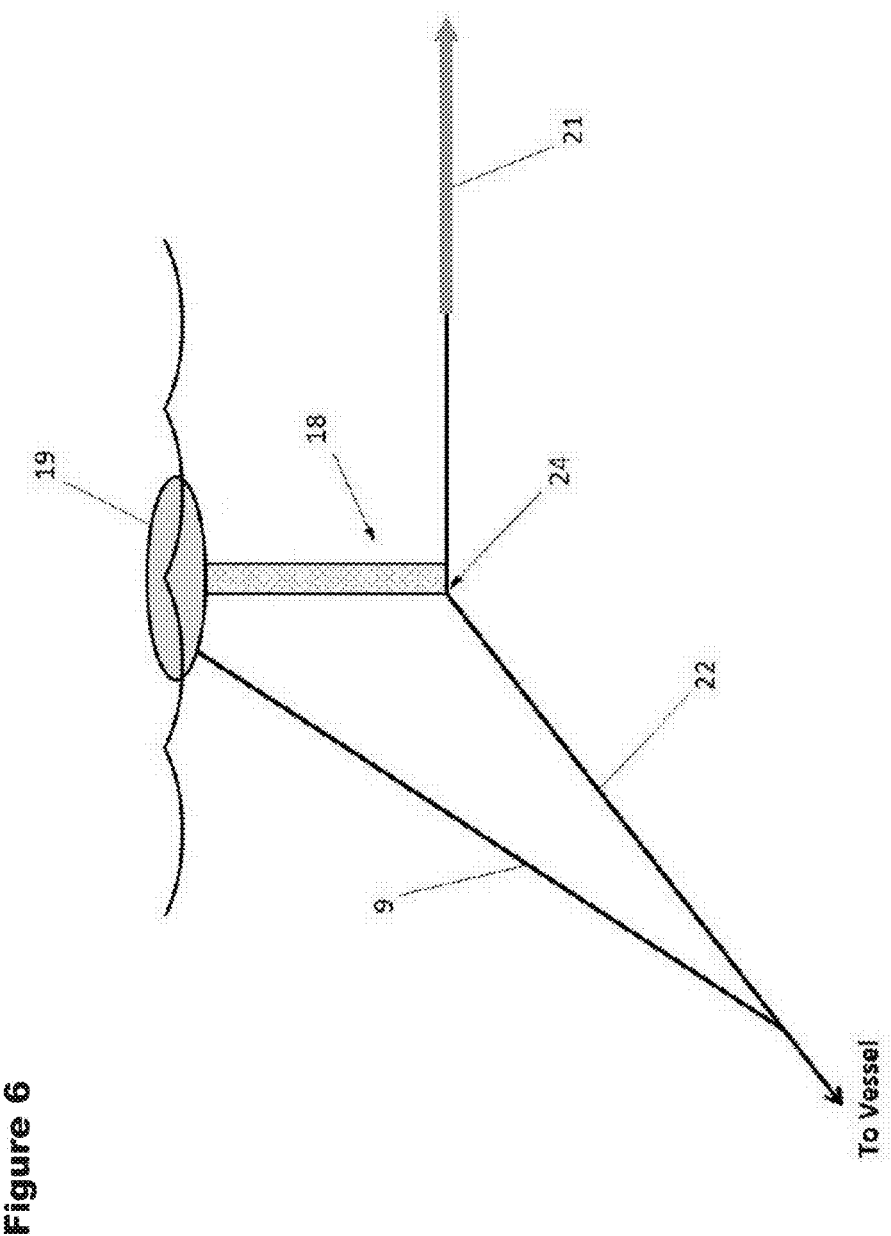
FIG. 6 is the schematic illustration of FIG. 4 with a fairing string according to the present invention.

According to the present invention, the fairing string 1 is used to replace the forward suspension rope 13 of the air gun sub-array 5 as shown in FIG. 5 or the float tagline 18 as shown in FIG. 6. In this position, the use of the fairing string 1 provides a mechanism for generating hydrodynamic lift forces to achieve desired lateral positioning of the towed equipment within the overall array. As well, the suspension ropes threaded through the fairing string are adjustable such that the fairing string can be used to provide steering forces to control the dynamic positioning of the air gun sub-arrays 5 and streamer cables 21 towed behind the exploration vessel 2.

Figure 8:
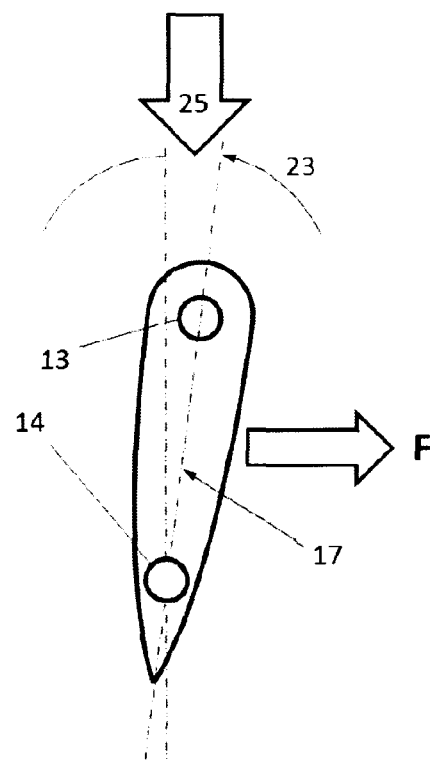
FIG. 8 is a cross-sectional view of a fairing string illustrating an angle of attack.

A suitably installed control device may be located either at the top end of the fairing string or at the bottom end of the fairing string to vary and control the angle of attack 23 between the central axis or chord 17 of the fairing string 1 and the direction of flow 25 shown in FIG. 8. The control device is used to selectively vary the length in either of the suspension ropes to thereby lengthen or shorten the relative rope lengths between the ends of the fairing string 1 and thereby effect steering of the fairing string 1. For example, the length of the aft suspension rope 14 may be adjusted in relation to the length of the forward suspension rope 13 or vice versa to effect differential length control such.

Figure 15:
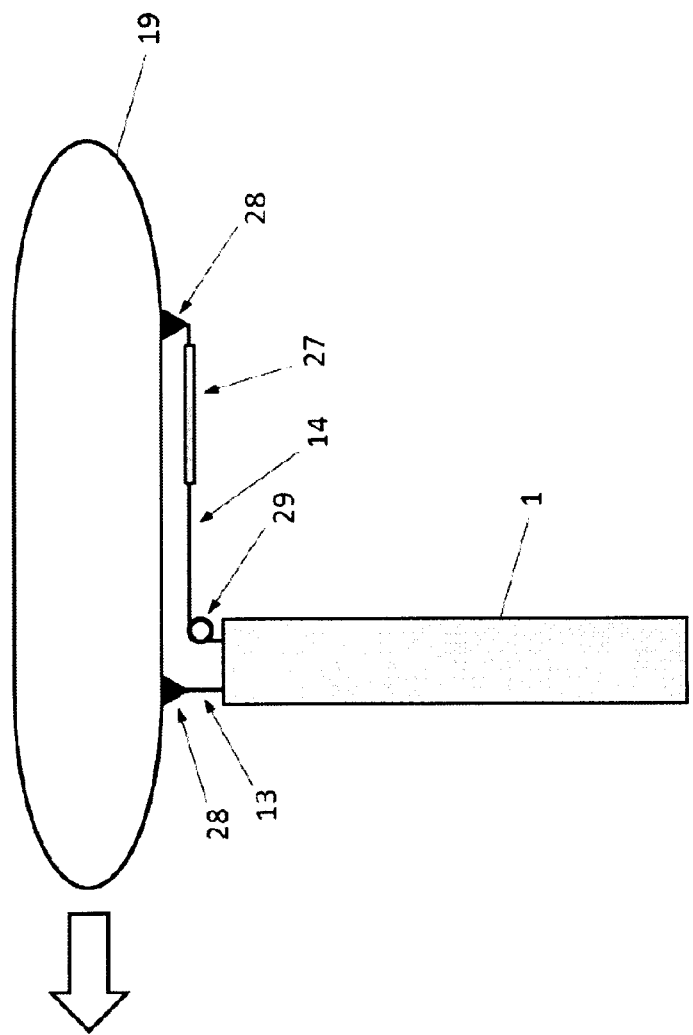
FIG. 15 is a schematic illustration of a pulley adjustment mechanism.

Examples of adjustment mechanisms that can be used include a standard turnbuckle 27 pulley arrangement 29 installed between the top end of the aft suspension rope 14 and an anchor point on the aft section of the head float 19 as schematically illustrated in FIG. 15. Alternatively, a ratchet winch can be used. For automated adjustment of the rope, an electric solenoid may be used. Other control options include a hydraulically or pneumatically controlled ram and piston, an electric winch, or a motor driving a rack and pinion.

Figure 7:
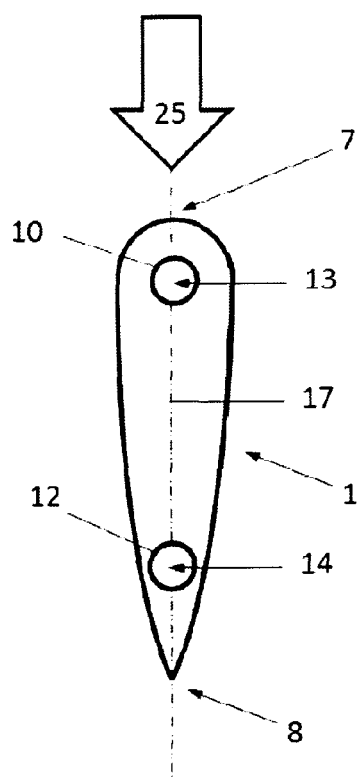
FIG. 7 is a cross-sectional view of a fairing string.

FIG. 7 illustrates the central axis or chord 17 of the fairing string 1 aligned with the direction of flow 25 indicating a 0° angle of attack. The forward suspension rope 13 is held at a length that is at least equal to the length of the aft suspension rope 14.

Increasing the length of the forward suspension rope 13 relative to the length of the aft suspension rope 14 will permit the leading edge of the fairing string 1 to rotate with reference to the trailing edge of the fairing string 1 to thereby take on an angle of attack 23 in response to hydrodynamic lifting force F exerted on the fairing string 1 by the flow as shown in FIG. 8.

FIG. 8 illustrates an angle of attack 23 and resultantly the generation of the lift or steering forces. The direction of the lift or steering forces are indicated by arrow F. The magnitude of the generated lift forces are proportional to the angle of attack 23. It is by this means of control that the fairing string 1 is steered. In particular, small adjustments in relative length of the ropes is highly effective in varying the angle of attack of the fairing string 1 and controlling steering forces.

As lift force is generated, the flexible fairing string will take on a half-wave sinusoidal profile along its span hereinafter called the "billow" effect. Since the forward suspension rope 13 is slightly longer than the aft suspension rope 14 in order to generate lift F, the amplitude of the sine wave of the forward suspension rope 13 is slightly greater than the amplitude of the aft suspension rope 14. The net effect of this difference in amplitude is that a slight twist develops along the length of the fairing string, such, the angle of attack exhibited near the ends of the fairing string 1 is relatively small, increasing to a maximum angle of attack at the midpoint of the fairing string 1. Resultantly, the center portion of the fairing string 1 generates more lift than end portions of the fairing string 1.

To improve steering control a preferred fairing string with an asymmetrical cross section may be used that generates lift forces at a 0° angle of attack. Thus, the fairing string 1 will always rotate in one direction only. An example of an asymmetrical foil cross section is a NACA 2318 although other reasonably selected NACA, Gottingen or Eppler cross sections may be used. Alternatively, the conduits for the forward and aft suspension ropes may be offset from each other in relation to the chord 17 to achieve the same purpose.

Figure 9:
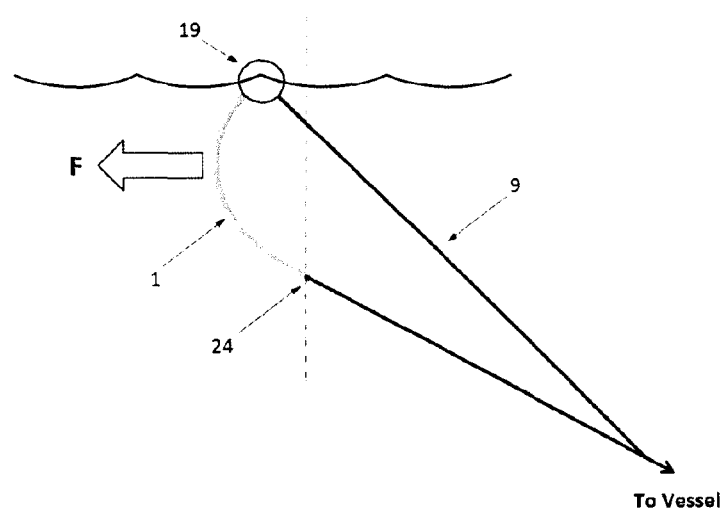
FIG. 9 is a front schematic illustration of FIG. 6.
Figure 10:
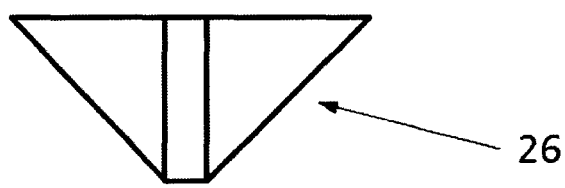
FIG. 10 is a top view of a depressor.
Figure 11:
FIG. 11 is a front view of a depressor.
Figure 12:
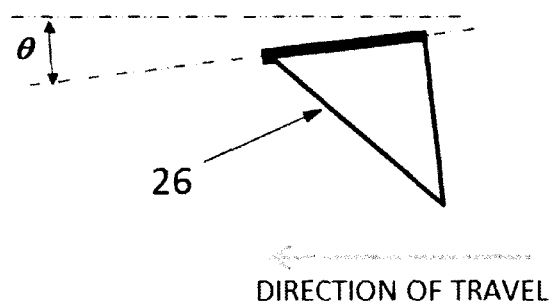
FIG. 12 is a side view of a depressor in the bottom position.
Figure 13:
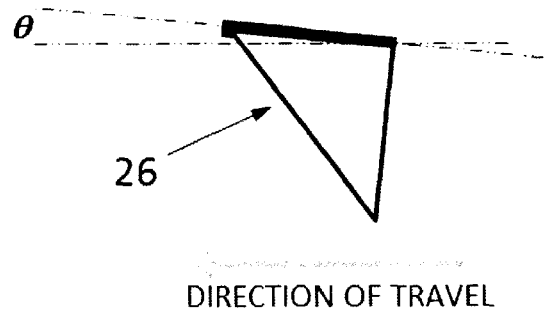
FIG. 13 is a side view of a depressor in the top position.
Figure 14:
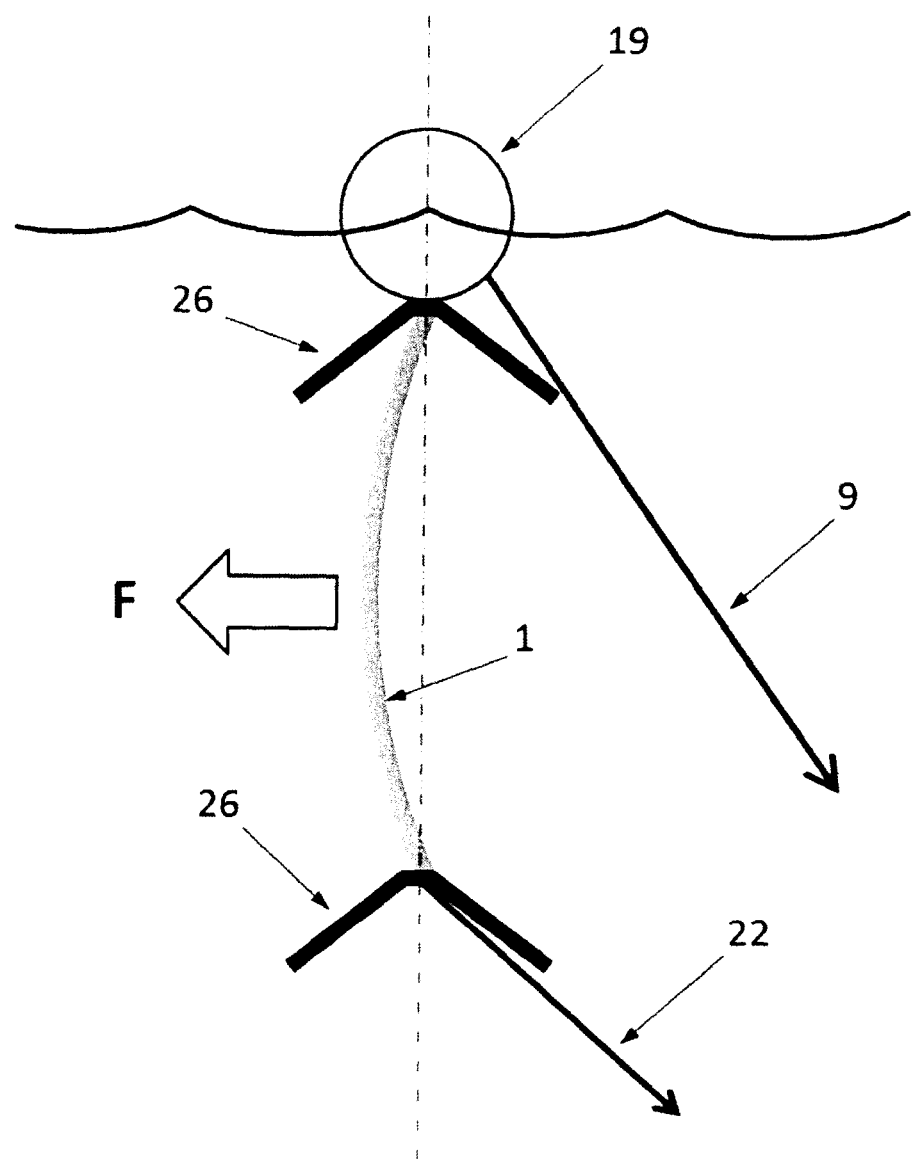
FIG. 14 is a schematic illustration of the fairing string with depressors installed at the top and bottom end of the fairing string.

In the application of the present invention to a float tagline 18 descending from a head float 19, as shown in FIGS. 6 and 9, the addition of a tow leader 9 may be necessary to counteract the tendency of the head float 19 to move outboard from the vertical and rearward resulting from the generated lift forces and towing drag forces. The tow leader 9 would limit the outboard movement and minimizes the layback angle ψ as shown in FIG. 4, ensuring maximum lift efficiency of the fairing string 1.

The billow effect results in a force being generated at the top end of the fairing string 1 that acts in a downward direction and a force being generated at the bottom end of the fairing string 1 that acts in an upward direction. To counteract the effect of these vertical forces and their tendency to move the ends of the fairing string 1 upward or downward, depressors may be used.

As shown in FIGS. 10-14, depressors 26 may be attached at the top and bottom ends of the fairing string 1 to counteract the above described forces. A preferred example of a depressor 26 is a delta wing hydrofoil which generates a downward force or an upward force depending upon the depression angle θ for which it is rigged.

The forces generated by the two depressors 26 are proportional to the tow speed of the exploration vessel 2 in the same manner as the lift forces F generated by the fairing string 1 are proportional to the tow speed of the exploration vessel 2. Resultantly, the opposing depressors 26 act to maintain a constant amount of billow in the fairing string 1 profile regardless of towing speed of the exploration vessel 2. Thus, the use of depressors 26 is one optional means of counteracting the vertical forces induced by the billow effect if required.

Other techniques may be optionally used in order to improve the control of the amount of lift generated by the fairing string 1. These include varying the chord length of the foil, specifying the length of suspension ropes and the length of fairing string 1 to be installed overtop of the suspension ropes, varying the degree of camber or asymmetry to the fairing foil shapes to be used at time of deployment and specifying the number of fairing strings 1 to be deployed per lead-in cable, or per source sub-array.

To facilitate an automated or remotely controllable fairing string 1 communication with the individual steerable fairing strings 1 can be achieved via a direct radio link between the exploration vessel 2 and a control device located in the head float of the sub-array or lead-in cable. Alternatively, communication can be achieved via direct electrical or optical connections through the umbilical or lead-in cables, or via underwater acoustic modems. Monitoring of the position of the fairing string 1 may be accomplished through conventional means such as, for example, GPS beacons on the surface floats or acoustic bracing using underwater pingers.

The preferred application of the present invention is to marine seismic arrays. Other applications include electromagnetic surveys, ocean bottom node surveys, or any other oceanographic application which requires towed equipment to be positioned behind the tow vessel.

Other advantages which are inherent to the invention are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

What is claimed:

1. A marine seismic array having a head float, the marine seismic array comprising:
   a foil having a leading edge, trailing edge, chord and span for attachment between a first head float position and bottom submerged position below the head float on the array,
   said foil being flexible along its span,
   said foil having a first interior conduit rearward of the leading edge and a second interior conduit forward of the trailing edge, said first and second conduits being centered on or offset to either side of the chord and separated by a distance;
   a first cable having a first length strung inside the first conduit and a second cable having a second length strung inside the second conduit; and
   an adjustment mechanism to vary the length of the first cable relative to the length of the second cable or vice versa.

2. The marine seismic array as claimed in claim 1 wherein said first and second cables are suspension ropes for a seismic source array.

3. The marine seismic array as claimed in claim 1 wherein said first and second cables are float tag lines for a seismic receiver array.

4. The marine seismic array as claimed in claim 2 or 3 wherein said foil is asymmetrical.

5. The marine seismic array as claimed in claim 4 wherein said foil has a NACA Gottingen or Eppler designated air foil shape.

6. The marine seismic array as claimed in claim 5 wherein said foil is designated NACA 2318.

7. The marine seismic array as claimed in claim 4 wherein said second conduit is laterally offset to either side of the chord.

8. The marine seismic array as claimed in claim 4 wherein said first conduit is laterally offset to one side of the chord and said second conduit is laterally offset to an opposite side of the chord.

9. The marine seismic array as claimed in claim 4 wherein depressors are attached at top and bottom ends of the foil.

10. The marine seismic array as claimed in claim 4 wherein the span of said foil is divided into a plurality of discreet segments.

11. The marine seismic array as claimed in claim 4 wherein said span of said foil is divided into a plurality of discreet segments which are attached to each other.

12. A system comprising a marine vessel, one or more cables towed by the marine vessel, a surface reference head float, and a fairing string, wherein one or more of said cables is connected at one or more locations along its length to the surface reference head float, and wherein the fairing string comprises:

a foil having a leading edge, trailing edge, chord and span for attachment between a first head float position and bottom submerged position below the head float on the array, said foil being flexible along its span, said foil having a first interior conduit rearward of the leading edge and a second interior conduit forward of the trailing edge said first and second conduits being centered on or offset to either side of the chord and separated by a distance;

a first cable having a first length strung inside the first conduit and a second cable having a second length strung inside the second conduit; and an adjustment mechanism to vary the length of the first cable relative to the length of the second cable or vice versa.

13. The system as claimed in claim 12 wherein said first and second cables are suspension ropes for a seismic source array.

14. The system as claimed in claim 12 wherein said first and second cables are float tag lines for a seismic receiver array.

15. The system as claimed in claim 13 or 14 wherein the adjustment mechanism is remotely controlled from said marine vessel.

16. The system as claimed in claim 15 wherein said remote control is wireless.

17. The system as claimed in claim 15 wherein said remote control is by an electrical connection between said marine vessel and said adjustment mechanism.

* * * * *